United States Patent [19]
Möbius

[11] Patent Number: 5,939,809
[45] Date of Patent: Aug. 17, 1999

[54] ROTOR WITH PERMANENT MAGNETS FOR AN ELECTRIC MOTOR

[75] Inventor: Marcos Romeu Möbius, Joinville - SC, Brazil

[73] Assignee: Empresa Brasileira de Compressores S/A Embraco, Joinville SC, Brazil

[21] Appl. No.: 08/930,494

[22] PCT Filed: Oct. 1, 1996

[86] PCT No.: PCT/BR96/00045

§ 371 Date: Oct. 27, 1997

§ 102(e) Date: Oct. 27, 1997

[87] PCT Pub. No.: WO97/13311

PCT Pub. Date: Apr. 10, 1997

[30] Foreign Application Priority Data

Oct. 4, 1995 [BR] Brazil .................................... 9504773

[51] Int. Cl.$^6$ .................................................. H02K 21/12
[52] U.S. Cl. ........................... 310/156; 310/218; 310/270
[58] Field of Search .................................... 310/156, 218, 310/270

[56] References Cited

U.S. PATENT DOCUMENTS 3,386,164  6/1968  Gerhard .................................... 29/598

FOREIGN PATENT DOCUMENTS 2717963  9/1995  France .
4-165932  6/1992  Japan .

OTHER PUBLICATIONS

Patent Abstracts of Japan vol. 012, No. 318 (E–650), Aug. 29, 1988 & JP,A,63 080744 (Mitsubishi Electric Corp), Apr. 11, 1988, see abstract.

Patent Abstracts of Japan vol. 017, No. 668 (E–1473), Dec. 9, 1993 & JP,A,05 219668 (Toshiba Corp), Aug. 27, 1993, see abstract.

Patent Abstracts of Japan vol. 014, No. 457 (E–0986), Oct. 2, 1990 & JP,A,02 184231 (Matsushita Electric Ind Co, Ltd), Jul. 18, 1990, see abstract.

Patent Abstracts of Japan vol. 012, No. 044 (E–581), Feb. 9, 1988 & JP,A,62 193540 (Fanuc Ltd), Aug. 25, 1987, see abstract.

*Primary Examiner*—Nestor Ramirez
*Assistant Examiner*—Thanh Lam
*Attorney, Agent, or Firm*—Darby & Darby

[57] ABSTRACT

A rotor with permanent magnets for an electric motor, comprising a plurality of magnets (2, 20) disposed around the circumferential surface of a rotor core (1, 10) and equally spaced from each other, an external cover (40), affixing the magnets against the rotor core, each magnet (20) being seated onto the core (10) through corresponding supporting means (30, 50, 60), which are restrained from displacements relative to each said magnet (20) and which are positioned, according to alignments parallel to each other and to the rotor access, symmetrically in relation to a longitudinal plane of symmetry (X) of the magnet (20) and spaced from each other by a distance smaller than the distance between the end lateral edges (21) of the magnet (20), in order to minimize the distance between the regions in which the reaction force of both the rotor core (10) and external cover (40) is applied on each magnet (20) under different temperature conditions of the rotor.

8 Claims, 2 Drawing Sheets

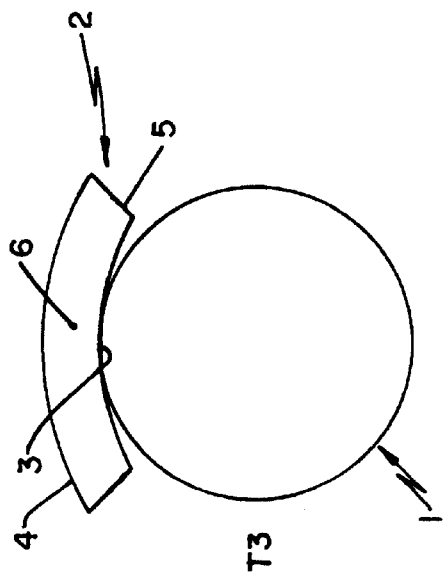
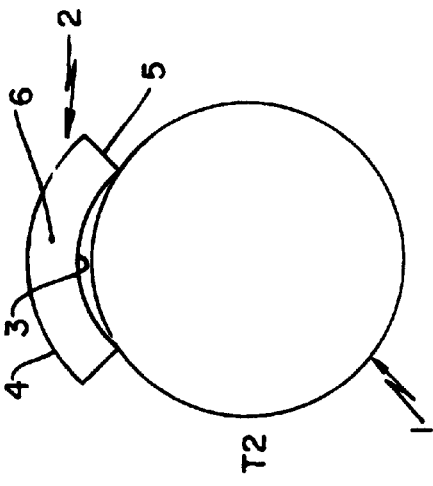
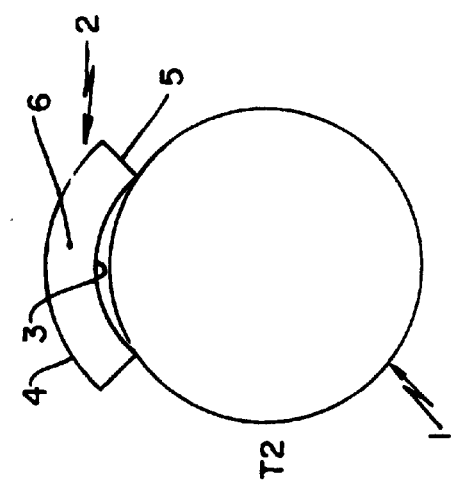
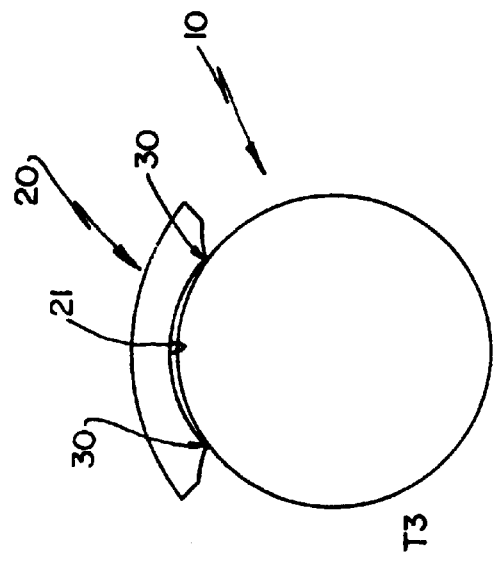
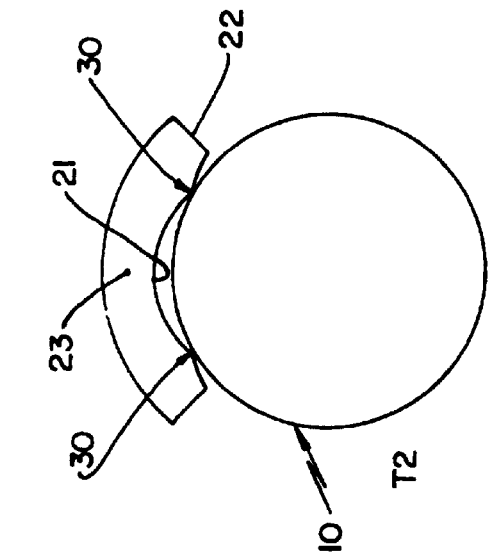
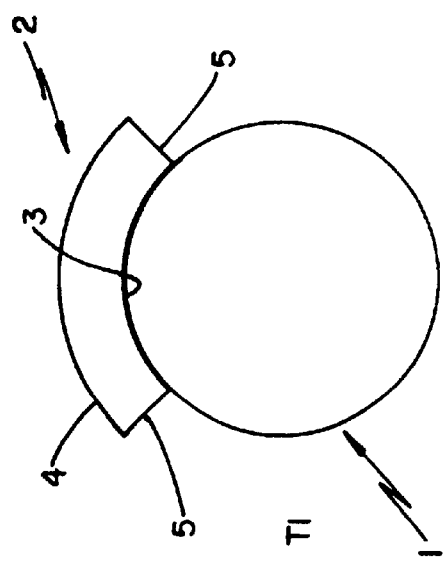

ROTOR WITH PERMANENT MAGNETS FOR AN ELECTRIC MOTOR

FIELD OF THE INVENTION

The present invention refers to a rotor construction for an electric motor having permanent magnets particularly of the type used in hermetic compressors of refrigerating appliances.

BACKGROUND OF THE INVENTION

Rotors with permanent magnets consist of a cylindrical core made of solid or rolled iron, around which there is disposed a plurality of magnets usually made of strontium or barium ferrite, or samarium cobalt and generally in the form of arcuated plates having internal surfaces with a contour that coincides with the circumferential contour of the rotor to which said magnets are mounted.

During operation, the rotors with magnets are submitted to centrifugal forces, moments of force and stresses of thermal origin, all of very high intensity. Due to these forces, the retention of the magnets to the rotor assumes a great importance in determining the efficiency of the motor. Different methods and techniques of retaining the magnets to the rotor are known in the art, such as that disclosed in U.S. Pat. No. 5,175,461 (Ziegler). Among the usual techniques for retaining the magnets to the rotor, the following are known: gluing said magnets to the external surface of the rotor; compressively surrounding the magnets close to the rotor core by an external cover, using or not using glue for the previous fixation of the magnets to the core; and enclosing the magnets in a structure, such as a cage mounted around the core, where the magnets are disposed in predetermined positions in said structure.

Except for the magnet enclosure technique, the other techniques mentioned above do not allow to obtain a rotor which guarantees a high reliability and which maintains unaltered a determined performance during the useful life of the motor. The main failures that may occur with the rotors constructed according to these techniques are: degradation of the magnets, due to the appearance of cracks, chips, etc.; degradation of the glue used to affix said magnets to the core, with loss of its properties and even of its function, which may generate residues; and degradation of the external cover that surrounds the magnets, with permanent deformations and loss of its function, in case it has a pre-tensive function, which may impair the air gap between the rotor and the stator. The use of covers made of a thin material, usually iron, steel, brass, copper, aluminum, etc., also presents problems of electrical losses which, in certain applications, may be very high. Moreover, the covers, when subjected to continuous and extended variations of temperature and rotation, due to the operational regimen of the equipment where the rotor is mounted, may suffer irreversible deformations.

While the magnets may support relatively high compression forces, they are fragile regarding tension and impact. The prior art solutions to aggregate the magnets to the core imply both in compression and tension forces, though shearing forces may also occur in a less significant form, resulting from torque and accelerations.

Among the stresses that affect both the magnets and the cover, those of thermal origin are usually much more significant than the other stresses supported by said elements during the operation of the motor to which they are aggregated. However, the thermal stresses depend on the manner used to maintain the magnets retained to the rotor and on the variation of the temperature to which the motor is submitted.

The origin of the thermal stresses lies on the fact that the coefficients of thermal dilatation of the material of which the magnet is made and of the material of the core, cover and glue are different from each other. The difference in the coefficients of thermal dilatation implies in the tendency of occurring relative displacements between said elements, which may impair the physical integrity of the magnets, mainly when the fixation thereof to the core is obtained by gluing or by the provision of a cover retaining them close to the core.

Besides the difference of the coefficient of thermal dilatation between the materials that form the above cited elements, the magnets have, due to their constructive form and magnetic orientation, differentiated coefficients of thermal dilatation, which vary according to their dimensions in the radial, transversal and longitudinal directions.

Though the solution using the enclosure of magnets solves the above cited problems for the glue and cover solutions, it has other inconveniences, such as high cost and reduction of motor efficiency, due to the large air gap provided in function of the large design dimensions required, since the materials having low losses are structurally fragile or have high cost.

Due to the inconveniences described above, said known prior art solutions are not recommended to be used in equipments requiring low cost, low generation of residues and high reliability, such as it occurs, for instance, with the hermetic compressors for refrigerating systems.

DISCLOSURE OF THE INVENTION

Thus, it is a general object of the present invention to provide a rotor with permanent magnets for electric motors, which, without increasing significantly the rotor-stator air gap, maintains the magnets affixed to the rotor, without submitting these magnets to stresses that may impair their integrity.

A more specific object of the present invention is to provide a magnet construction which, when affixed to the rotor by a surrounding external cover, does not present the prior art deficiencies.

A further object of the present invention is to provide a magnet construction for the rotor of an electric motor, which minimizes the effect of stresses over the surrounding external cover, reducing the deformations of the latter.

These and other objectives are attained by a rotor with permanent magnets for an electric motor, comprising a rotor core, a plurality of magnets disposed around the circumferential surface of the core and equally spaced from each other; an external cover, affixing the magnets against the rotor core, each magnet being seated onto the core through corresponding supporting means, which are restrained from displacements relative to each said magnet and which are positioned, according to alignments parallel to each other and to the rotor axis, symmetrically in relation to a longitudinal plane of symmetry of the magnet and spaced from each other by a distance smaller than the distance between the end lateral edges of the magnet, in order to minimize the distance between the regions in which the reaction force of both the rotor core and external cover is applied on each magnet under different temperature conditions of the rotor.

BRIEF DESCRIPTION OF THE DRAWINGS

The invention will be described below, with reference to the attached drawings, in which:

FIGS. 1, 1a and 1b show, schematically and in a cross sectional view, a magnet mounted to a rotor under three different temperature conditions, according to the prior art;

FIGS. 2, 2a and 2b show, schematically and in a cross sectional view, a magnet mounted to a rotor under the three different temperature conditions of FIGS. 1, 1a and 1b above, but according to the present invention;

BEST MODE FOR CARRYING OUT THE INVENTION

Figure 3:
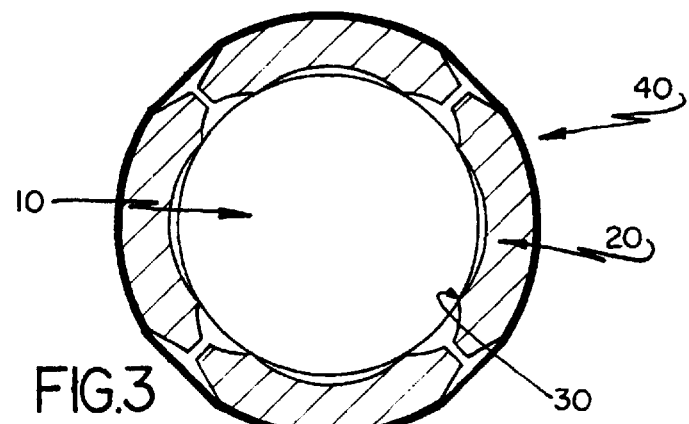
FIG. 3 shows schematically a cross sectional view of a rotor with the magnets constructed according to a first embodiment of the invention.

According to the illustrations, FIG. 1 shows a rotor assembly comprising a cylindrical core 1 of a rotor, carrying circumferentially around its surface a plurality of magnets 2 constructed according to the prior art. In this construction, each magnet 2 has an internal surface 3 contacting the core 1, an external surface 4 and end surfaces 5, the internal surface 3 and external surface 4 being arcuated, concentric and coinciding with the circumferential surface of the rotor core 1, when under a temperature condition T1. In this temperature condition, the magnets 2 constructed according to the prior art are perfectly seated against the circumferential surface of the rotor core 1. The internal radius of each magnet 2 coincides with the radius of the rotor core 1.

Variations of operational temperatures submit the magnet-rotor core assembly to deformation stresses that alter the perfect seating condition cited above, leading to magnet-core uncoupling situations. When submitted to a temperature T2 different from T1, the thermal effect over each element of said assembly will be differentiated, due to the different thermal coefficients of their materials. Under this temperature T2 (condition illustrated in FIG. 1a), each magnet 2 will be conducted to a deformation situation which results in a determined uncoupling degree in relation to the rotor core 1, said uncoupling being obtained due to a variation of the internal an external radiuses of each magnet 2 in relation to the radius of the rotor core 1. The temperature condition T2 leads to a "contraction" situation of the magnets 2, which have their internal and external radiuses reduced in relation to the radius of rotor core 1. As a consequence of this contraction, each magnet 2 is conducted to a coupling condition in relation to rotor 1, where the support of the magnet to said core is obtained only by contact of the end lateral regions of its internal surface with the circumferential surface of said core, defining along the longitudinal length of the latter, two supporting lines parallel to each other and to the rotor axis. In this uncoupling condition, said lateral regions of the internal surface 3 of each magnet 2 were conducted to a mutual approximation by being displaced along the circumferential surface of rotor core 1, whereas a median portion 6 of magnet 2 therebetween was conducted to a maximum spacing from the adjacent circumferential surface portion of rotor core 1, with which it had contact under temperature condition T1. This uncoupling condition may be called "stable uncoupling condition" due to the fact that, in cross-section, there are two points for magnet 2 to be supported to rotor core 1.

Under this temperature condition T2, the contact regions of each magnet 2 relative to rotor 1 are defined by the contact of the end lateral edges of the internal surface 3 of each magnet 2 which, under this temperature condition, are spaced from each other by a distance smaller than that of said end lateral edges when under temperature condition T1, said distances being measured on a plane transversal to the geometrical axis of rotor core 1. With this construction, the internal surface portion 3 of the magnets 2 between the magnet-core contact regions under temperature condition T2 has a radius smaller than that of rotor core 1. Though under said temperature condition T2 the balance is stable, magnet 2 is submitted to high stresses, which are enhanced when magnet 2 is affixed to rotor core 1 by gluing. Moreover, when there is provided an external surrounding cover retaining the magnets 2 to rotor core 1, the expansion of the median portion 6 of each magnet 2 makes pressure against an adjacent portion of said external cover, which may deform in an attempt to alleviate the stresses existing in this region. This stress alleviation means the formation of air gaps, which allow a spacing between the magnets and the rotor to occur during the operation of the latter by action of the centrifugal force generated with the rotational movement of said rotor, affecting the efficiency of the assembly.

The stress existing on each magnet 2 results from the occurrence of binaries of force thereon, with a large spacing between the points where the involved forces are applied. The radial forces acting over magnets 2 result from the reaction of rotor core 1 at the magnet-core contact regions, i.e., at the end lateral regions of magnet 2, as well as from the reaction of the cover on the median portion of said magnet 2.

When the magnet-core assembly is submitted to another temperature condition T3, different from T1 and opposite to T2, the thermal effect over the elements of said assembly will lead said magnet 2 to a situation of deformation that will cause another uncoupling relative to rotor core 1, different from that which occurred under temperature condition T2, though this uncoupling also results from a variation of the internal and external radiuses of each magnet 2 relative to the radius of rotor core 1. The temperature condition T3 leads to a situation of "expansion" of magnets 2, whose internal and external radiuses are increased in relation to the radius of rotor core 1. As a consequence of this expansion, each magnet 2 is conducted to a coupling condition with rotor core 1, where the support of magnet 2 to said core 1 is obtained only by contact of said median region of the internal surface of said magnet 2 with the circumferential surface of rotor core 1 defining, along the longitudinal extension of the latter, a unique central contact region parallel to the rotor axis. In this coupling condition, the end lateral regions of the internal surface 3 of each magnet 2 were conducted to a mutual spacing, moving away from the circumferential surface of rotor core 1 by a maximum distance of magnet-core spacing for these regions with which they maintained contact under temperature condition T1 or under temperature condition T2. Under temperature condition T3 the coupling is unstable, since it occurs, in cross section, in only one central contact region with the circumferential surface of rotor core 1. This instability impairs the mounting and the stability of the assembly, besides imparting to the latter higher stresses than those existing under temperature condition T2 in any of the options of magnet fixation to the core, i.e., by gluing and/or by providing an external cover. Under this temperature condition T3, there still exists the possibility of a mutual wearing contact between the end lateral regions of each two adjacent magnets 2.

According to the prior art magnet construction, the binaries of the forces acting over each said magnet have their regions of concentration and of force application modified between the contraction and expansion conditions to which said magnets are submitted by temperature variation. In the contraction condition, these regions approximate, whereas in expansion said regions are spaced from each other. In the first of said conditions (condition T2), the most important reaction force results from the reaction of the surrounding external cover against said median region, as a response to the effort of said cover to move away from the rotor core. The pressure of the rotor core on the end lateral edges of each magnet 2 acts in the opposite direction to that of the surrounding external cover. In the other of the conditions cited above (condition T3), the reaction force of the external cover on each magnet acts against the end lateral edges of said magnets, in order to make them return to contact rotor core 1, while the latter is reacting against the pressure of the median region of each magnet 2 on said rotor core 1.

Besides the stresses associated with the binaries, there are also added the shearing stresses resulting from rotational efforts, due to the existing torque and accelerations, besides the tension/compression effects resulting from the actuation of the centrifugal force occurring during the operation of the motor, which were not considered during the discussion above. The consequence of summing up these stresses is the chipping and breaking of magnets 2 and/or the deformation or breaking of the surrounding external cover that retains said magnets to the core.

Although these situations have been discussed regarding a determined condition of coefficients of thermal dilatation and magnetic orientation of the materials involved, the consequences presented are also valid to the other conditions which were not mentioned.

FIGS. 2–5 illustrate different rotor constructive forms, according to the present invention and which minimize the problems existing with the prior art construction.

According to FIGS. 2, 2a and 2b, the stresses discussed hereinbefore are minimized by disposing, between the rotor core 10 and magnets 20, rotor core-magnet supporting means, defining two alignments of contact with the circumferential surface of rotor core 10, said alignments occupying the whole axial extension of the respective magnet 20 and being parallel to each other and to the rotor axis and each being symmetrically disposed relative to a plane of symmetry X of the magnet.

According to the present invention, the provision of supporting means between each magnet 20 and rotor core 10, in previously determined regions, determines the regions for the application of the binary forces which, with the thermal variation to which the rotor is submitted and with force application arms smaller than those of the prior art, have their maximum values balanced and reduced to values within the safety technical limits.

In a way for carrying out the invention, as illustrated in FIGS. 2, 2a, 2b and 3, the supporting means are incorporated to each magnet 20, from the internal surface 21 thereof, in the form of radial projections 30, preferably continuous and which are spaced from each other by a distance D1 smaller than the distance between the end lateral edges 22 of magnet 20, said distances being taken on a plane transversal to the rotor axis.

Externally to the projections 30, the internal surface 21 of each magnet 20 has a bevelled end, preferably of arcuated profile, which prevents said region from contacting the circumferential surface of rotor core 10 when under temperature condition T2.

When subjected to temperature condition T2, each magnet 20 is lead to the "contraction" state, as discussed in the prior art, with the mutual approximation of the axial projections 30, reducing the distance D1 therebetween and consequently the radius of the internal surface 21 of each magnet 20 between said projections 30. Due to this approximation, the end lateral edges 22 of each magnet 20 are also approximated to the adjacent circumferential surface portion of rotor core 10, at the same time that the distance increases between said portion and a median portion 23 of magnet 20. With this constructive form of magnet 20, there is no change in the balance condition between temperatures T1 and T2, meaning that the conditions of force reactions of rotor core 10 in relation to magnet 20 remain substantially unaltered by this thermal variation.

The positioning of each axial projection 30 in relation to the end lateral edges 21 and to the plane of symmetry X of each respective magnet 20 is calculated so that the binaries generated by the reactions of rotor core 10 and of a surrounding external cover 40 on each magnet 20 have forces applied in smaller distances than those of the prior art, reducing the stresses on said magnets 20.

Under the "expansion" condition, that is, when the magnet-core assembly is under temperature T3, the axial projections 30 are lead to a maximum mutual spacing, increasing the distance D1 between said projections 30 and also the radius of the internal surface portion of each magnet 20 between said projections 30. The end lateral edges 21 of each magnet 20 are at a maximum radial distance from the adjacent circumferential surface portion of rotor core 10.

In another way for carrying out the invention, the magnet-core supporting means are defined by pairs of axial spacing elements 50, preferably longitudinal and continuous, disposed between each magnet 20 and the surface of rotor core 10, spaced from the end lateral edges of each said magnet 20, such as calculated in the solution of the axial projections 30. In order to avoid that, during the operation of the motor, displacements of the magnets occur in relation to the supporting means, each pair of said axial spacing elements 50 is previously adequately obtained, such as by gluing to the respective magnet 20 before retaining them to rotor core 10 by providing the surrounding external cover 40. The spacing elements may optionally be affixed to core 10. A constructive variant has part of the spacing elements 50 affixed to core 10 and part to magnets 20. In another solution, illustrated in FIG. 5, the spacing elements are incorporated to the circumferential surface of rotor core 10 in the form of axial projections 60, preferably continuous and longitudinal, as described in relation to the axial projections 30 provided from the internal surface 21 of magnets 20.

In any of the solutions with spacing elements 30, 50, 60, the magnet-rotor core assembly may receive, incorporated or not to said spacing elements or to the surface of rotor core 10, lateral spacing elements 70 disposed between each two magnets 20, in order to avoid friction contacts therebetween during the operation of the motor.

In order to minimize the stresses over the surrounding external cover 40, each magnet 20 further presents the external surface portion of its lateral edges 22 in a chamfered form, so that, when said magnets 20 are under the expansion condition, the deforming stress over the surrounding external cover 40 is minimized. Though not illustrated, other constructions for the spacing means are possible within the concept presented, such as an annular cylindrical element mounted between the magnets and the rotor core, axial or longitudinal spacing elements, not continuous and alternately provided from the internal surface of each magnet and from the circumferential surface of the rotor core, etc..

Figure 6:
FIGS. 6, 6a, 6b and 6c illustrate other constructive forms for the supporting means and spacing elements according to the present invention.
Figure 6A:
Figure 4:
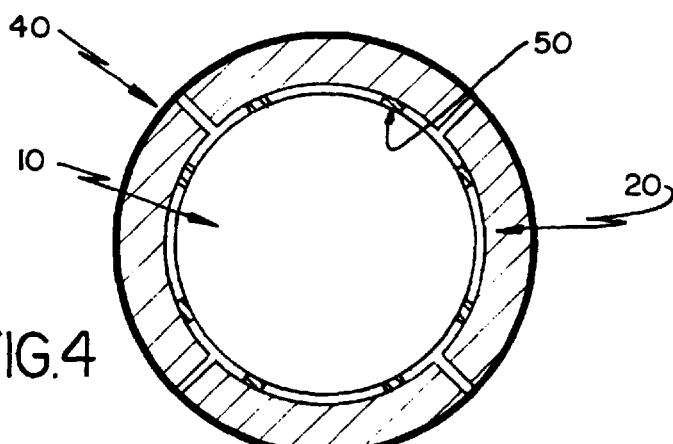
FIG. 4 shows schematically and in a cross sectional view, a rotor provided with magnets and external cover, according to a second embodiment of the present invention.
Figure 6B:
Figure 6C:
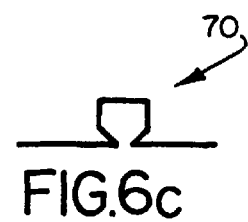
Figure 5:
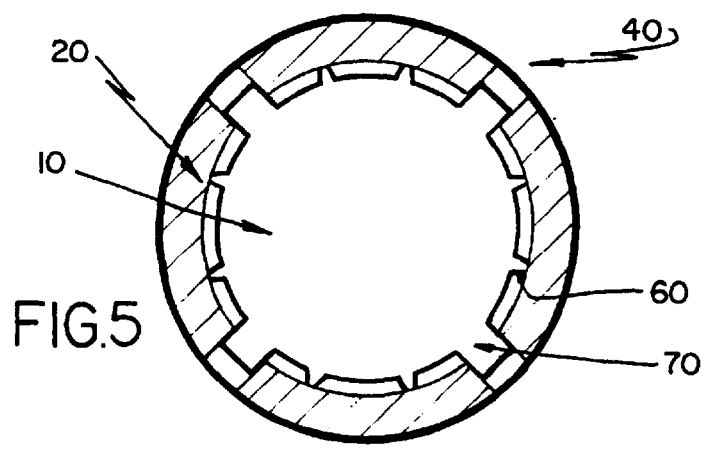
FIG. 5 shows schematically and in a cross sectional view, a rotor provided with magnets and external cover, according to a third embodiment of the present invention.

The determination of the shape for the supporting elements, as well as for the lateral spacing elements, results from an optimization of the characteristics considered relevant for said elements, such as anchoring and shearing of the magnets, associated electrical losses and manufacturing process (difficulty, costs, etc.). Among the possible shapes, those illustrated (FIGS. 6, 6a–6c) present a better response to the considered factors, the constructions with best results being those with a square profile having chamfered or rounded corners (FIGS. 6, 6a), or also those with a narrowed base (FIGS. 6b and 6c).

I claim:

1. A rotor with permanent magnets for an electric motor, comprising:

a rotor core;

a plurality of magnets disposed around the circumferential surface of said core and equally spaced from each other;

supporting means for seating each magnet on the core, said supporting means being fixed in position relative to each said magnet; and an external cover, holding said magnets in position relative to said rotor core, parallel to each other and to the axis of said rotor, symmetrically in relation to a longitudinal plane of symmetry (X) of a said magnet and spaced from each other by a distance (D1) smaller than the distance between the end lateral edges of a said magnet to minimize the effects of reaction force of both said rotor core and said external cover applied to each magnet under different temperature conditions of the rotor.

2. Rotor, as in claim 1, wherein said supporting means are incorporated to at least one of each of said plurality of magnets and said rotor core.

3. Rotor, as in claim 2, wherein said supporting means comprise longitudinal projections on the circumferential surface of said rotor core to engage said magnets.

4. Rotor, as in claim 3, wherein said lateral spacing elements are incorporated to the circumferential surface of said rotor core.

5. Rotor, as in claim 1, wherein said supporting means comprise axial spacing elements on at least one of the internal surface of a said magnet and the external surface of said rotor core.

6. Rotor, as in claim 1, further comprising lateral spacing elements disposed between each two adjacent magnets disposed around the circumferential surface of the said core.

7. Rotor as in claim 1 wherein said supporting means engages one of the opposing inner surface of said magnets and surface of said rotor core.

8. Rotor as in claim 1 wherein said supporting means for each magnet comprises at least two parallel elements spaced apart on one of a said inner surface of a magnet or extending from the surface of said rotor to oppose the magnet inner surface and lying in a direction along the rotor axis.

* * * * *